Aug. 3, 1954
W. M. TRIGG ET AL
PROCESS OF IMPREGNATING UNFIRED INORGANIC
BODY WITH ORGANOSILICON COMPOUNDS
AND ARTICLE RESULTING THEREFROM
Filed June 28, 1949
2,685,533
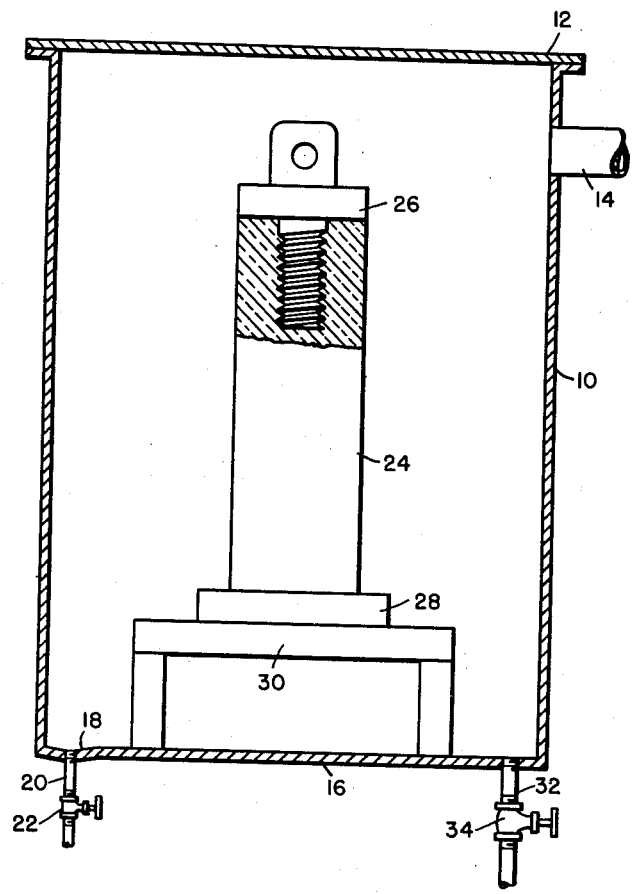
WITNESSES:
Edward Michaels
New L. Gromul
INVENTORS
Warren M. Trigg &
Robert D. Rowley.
BY
Frederick Shapoe
ATTORNEY Patented Aug. 3, 1954

2,685,533

UNITED STATES PATENT OFFICE 2,685,533

PROCESS OF IMPREGNATING UNFIRED INORGANIC BODY WITH ORGANOSILICON COMPOUNDS AND ARTICLE RESULTING THEREFROM

Warren M. Trigg and Robert D. Rowley, Pittsburgh, Pa., assignors, by mesne assignments, to the United States of America as represented by the Secretary of the Navy Application June 28, 1949, Serial No. 101,876

7 Claims. (Cl. 117—72)

This invention relates to unfired molded inorganic bodies treated with organosiloxanes to provide for improved electrical characteristics and other properties.

There are employed in industry today large quantities of unfired molded bodies of inorganic compositions. Thus the reaction product of finely divided mica and lead borate glass is heated to a moldable softening temperature and numerous insulators and other structural elements are molded therefrom. Compounds of aluminum phosphate heated to their softening point are pressed and molded to various desirable shapes for use as electrical insulators. Molded sheets and bodies of numerous kinds are prepared by combining Portland cement with asbestos fibers, with or without ground slate, barytes and like powdered inorganic materials, the whole being admixed with water to enable molding under pressure into coherent shapes that are cured in steam ovens. In each of these typical examples, the compositions while heated to a softening point are not fired to vitrification or to a sintering temperature. These unfired molded products are all characterized by being relatively porous and water absorbent as compared to fired porcelain and similar vitrified members which are relatively non-porous. A particularly undesirable characteristic of such unfired organic bodies is the highly variable electrical insulating resistance value, which resistance becomes particularly low when the bodies are exposed to high humidity atmospheres. The dielectric strength, power factor and ohmic resistance vary markedly with the relative humidity. If accidentally immersed or wetted with water, these bodies are unsatisfactory electrical insulators for severe service for long periods of time until thoroughly dried or baked out. Proposals have been advanced heretofore for treating such unfired inorganic bodies with various resins, but with little improvement in electrical properties. Such improvements have been relatively minor and do not render the body suitable for many electrical applications.

By an "unfired molded body" is meant a body that is not heated to sinter it after molding. It has been suggested heretofore that electrical insulators be coated with organosiloxane resins and we have attempted to treat the unfired molded bodies with organosiloxane resins but have found that no substantial improvement in properties results from such impregnation. For example, a series of bushings composed of molded lead borate mica composition were vacuum impregnated with a heat-hardening organosiloxane resin and their electrical properties were compared with unimpregnated bushings and we found no substantial difference in dielectric strength or power factor. Likewise treatment of unfired molded bodies with organosilicon chloride vapors, which are effective on porcelain, failed to produce any improvement in the resistance to deterioration of insulation properties when wet.

The object of this invention is to provide for producing an improved unfired, molded inorganic body by treating the surface of the body with a specific aminosilane, hydrolyzing the aminosilane on the surface of the body and heat treating the applied organosilane to dehydrate and condense it on the surface of the body and thereafter apply a heat hardenable organosiloxane resin.

A further object of the invention is to provide a process for producing unfired molded inorganic bodies with a highly adherent protective organosiloxane composition on the surfaces thereof.

Other objects of the invention will in part be obvious and will in part appear hereinafter. For a better understanding of the nature and objects of the invention, reference should be had to the following detailed description and drawing, in which the single figure is a view in elevation partly in section showing one form of apparatus for carrying out the process of the invention.

Specifically, it has been discovered that if molded unfired inorganic bodies are coated with a readily hydrolyzable aminosilane in combination with water so as to thoroughly cover all of the exposed surfaces and porosities of the body and then the treated body is baked at a temperature sufficient to hydrolyze and then to dehydrate and condense the applied aminosilane, that the surface is conditioned to resist the deleterious effects of moisture. Such aminosilane treatment also enables exceptional cooperation with subsequent coating or impregnation with heat hardenable organosiloxane resins.

The initial treatment of the unfired molded inorganic body is effected by completely covering all its exposed surfaces with a coating of a low molecular weight, highly penetrating aminosilane compound having an average of from 1 to 3 hydrolyzable, monovalent amino radicals and the remaining substituents on the silicon being selected from the group consisting of hydrocarbon and hydrocarboxony radicals, in combination with sufficient water to enable the hydrolysis of the aminosilane, and the body so coated is heated for at least one hour at 100°

C. to cause the aminosilane to be hydrolyzed, dehydrated and condensed to an organosiloxane film. The organosiloxane film so produced is highly adherent and resistant to moisture. The inorganic body may be used without any additional treatment or it may be further treated thereafter with a heat hardenable, partially condensed, hydrocarbon organosiloxane containing an average of from more than one to less than two monovalent hydrocarbon radicals per silicon atom and upon heat treatment there is produced a superior unfired molded inorganic body than has been produced by any process known heretofore.

The aminosilane used in the initial treatment of the inorganic bodies may be applied to them after the organic body has been treated with water or the aminosilane may be admixed with water before being applied, or previous to the application of the water required for hydrolyzing the aminosilane. We have found that the most penetrating and thorough coating of the inorganic bodies is secured if the aminosilane is vapor coated thereon. The water may be similarly condensed on the bodies from a vapor state. The aminosilanes are preferably those with a low boiling point so that they exert a substantial vapor pressure at moderate temperatures. Examples of suitable aminosilanes are diamino-dibutoxy-silane, monoaminotriethylsilane, diaminodimethylsilane, diaminodiethoxysilane and triaminopropoxysilane. Mixtures of the aminosilanes may be employed.

Referring to the figure of the drawing, there is illustrated one form of suitable apparatus for practicing the invention. The apparatus comprises a container 10 provided with a sealable readily removable cover 12 through which members to be treated may be introduced into the container 10. A conduit 14 connectable to a source of vacuum or the atmosphere is attached to the side wall of the container 10. The bottom wall 16 of the container is provided with a depressed portion 18 connected to a pipe 20 fitted with a valve 22 for controlling the flow of the aminosilane from a suitable supply into the container. A molded inorganic body 24 composed of, for example, a lead borate-mica reaction product which has been heated and molded to shape, without being fired thereafter, and provided with an integral metal terminal 26 at the upper end and a metal base 28 at the lower end forming an integral part thereof is placed upon a stand 30 within the container 10. A second conduit 32 is connected into the bottom wall 16 of the container through which the flow of a heat hardenable organosiloxane may be effected by manipulating a valve 34 therein.

The insulator 24 may be provided initially with a film of water by maintaining an atmosphere of above 80% relative humidity within the container 10. In one hour while at a temperature of 50° C. and higher, the insulator will be sufficiently coated with a film of moisture. An atmosphere of a relative humidity of 100% at a temperature of 80° C. applied for a short period of time will insure that all of the surface and the exposed pores and interstices of the body 24 have been coated with a film of moisture which naturally forms under such conditions. The atmosphere laden with water vapor may be then withdrawn by means of the vacuum applied to the conduit 14 for a few minutes. Thereafter, the aminosilane may be introduced through the pipe 20 to form a small pool in the depression 18. The internal pressure and temperature of the container 10 are so maintained that the aminosilane maintains a substantial vapor pressure within the container. The organosilane vapors will readily penetrate into any open pores and will condense upon all of the exposed surfaces of the inorganic body, 24 where the film of water present will be present to react with the organosilane. Exposure to the organosilane vapors for a period of one hour has been found to give good results though periods as short as 15 minutes or less may be satisfactory. The absolute pressure in the container 10 has been maintained as low as two inches of mercury, though a range of pressures of from one inch of mercury up to amtospheric may be employed depending on the organosilane, while the temperatures may vary from room temperature to over 100° C.

After the body 24 has been filmed or coated with the intermixed water and aminosilane vapor condensate, it is removed from the container 10 and put into an oven where it is baked, for example one hour at 100° C., to complete the hydrolysis of the organosilane and then to cause the hydration and condensation of the applied condensate to provide an adherent organosiloxane film covering all of the exposed surfaces of the inorganic body.

After heat treatment, the inorganic body 24 may be returned to the same container 10 and a heated hardened partially condensed hydrocarbon organosiloxane resin admitted through the conduit 32 in a sufficient amount to immerse the body 24 therewith. Air or gas under pressure may be admitted through the conduit 14 to force the organosiloxane resin to penetrate into the interstices of the body. After being so impregnated, the body 24 may be withdrawn, permitted to drain and then baked at elevated temperature to heat harden the organosiloxane resin. The following examples are illustrative of the practice of the invention.

EXAMPLE I

A bushing composed of the molded reaction product with lead borate glass and finely divided mica was treated in a container in an atmosphere of 100% relative humidity at 60° C. for 6 hours. The moisture treated bushing was then subjected to a vacuum of 27 inches of mercury for 30 minutes, after which 100 cubic centimeters of a diaminoditertbutoxysilane was placed in the container while maintaining the vacuum. The vapors of the aminosilane were permitted to stay in contact with the bushing for two hours. Thereafter, the bushing was removed from the container and heat treated at 135° C. for several hours. The treated bushing was then put back in the container, a vacuum of 27 inches of mercury applied and then a heat hardenable organosiloxane resin varnish comprising an average of 1 methyl group and 0.9 phenyl group per silicon atom and dissolved in toluene to provide a 50% solution was introduced into the container in an amount sufficient to immerse the bodies. The bodies were allowed to stand immersed in the organosiloxane for two hours at atmospheric pressure after which they were removed, drained for a few minutes and baked for two hours at 200° C. The following table indicates the electrical properties of several bushings before and after this treatment.

Table

| Bushing No. | Before Treatment | | After Treatment | |
|---|---|---|---|---|
| | Dielectric Strength | Power Factor, percent | Dielectric Strength | Power Factor, percent |
| 1 | 9,000 | 55 | 20,000 | 11 |
| 2 | 9,500 | 55 | 20,000 | 11 |
| 3 | 8,500 | 50 | 17,000 | 11 |

The same organosiloxane varnish was applied to other bushings without the initial treatment with the aminosilane vapors, and the applied organosiloxane varnish baked in the same manner, and comparisons made of the properties before and after treatment with the organosiloxane alone. No improvement was obtained in either dielectric strength or power factor by this last treatment.

EXAMPLE II

Lead borate-mica insulators were dipped into a composition comprising diaminoditertbutoxysilane and water in an amount sufficient to hydrolyze the amino groups, being immersed for two hours and then withdrawn and baked for two hours at 135° C. The power factor of the treated insulators was 1.1% immediately after the baking treatment; while after immersion in water at 25° C. for 48 hours the power factor was 9.47%, the increased power factor being due to a surface moisture film which would drop when the insulator was dried. The insulation resistance did not go below 40,000 megohms after immersion while, when dry, the insulation resistance was 200,000 megohms. By comparison, an untreated insulator had insulation resistance of 0.5 megohm after immersion and the power factor was over 50%.

By further coating the treated insulators with organosiloxane resins, as in Example I, improved insulating properties are secured.

EXAMPLE III

Members were prepared from a mixture of 50% Portland cement and 50% asbestos fibers which was moistened, molded, steam cured and baked in accordance with well-known practice. The members were treated as set forth in Example II. An aminosilane treated sample and an untreated sample of the asbestos-Portland cement molding was immersed in water for 48 hours, then permitted to stand at room temperature (25° C.) and a relative humidity of 50%, for 60 minutes. Electrical resistance tests at the end of this time indicated a resistance of 1520 megohms for the aminosilane treated product and less than 0.17 megohm for the untreated product.

Numerous heat hardenable hydrocarbon organosiloxane resins may be employed for coating the aminosilane treated members in the practice of the present invention. There may be employed the methyl siloxanes, phenyl dodecyl siloxanes, phenylmethylsiloxanes, phenylethylsiloxanes, allylphenylsiloxanes and other compounds wherein aliphatic, aryl, cycloaliphatic, and alkaryl groups may be attached to silicon preferably with an average ratio of the hydrocarbon groups being more than one and less than two per silicon atoms. Suitable hydrocarbon groups are ethyl, methyl, propyl, butyl, cyclohexyl, phenyl, tolyl, xylyl, naphthyl, allyl and methylallyl. The organosiloxanes may be applied with curing catalysts such as benzoyl peroxide, cobalt naphthenate, lead lineoleate, and the like as is well known.

The aminosilane may be admixed with up to 200% of its weight of a fluid silicone composed of dialkyl silicon oxide units or having dialkyl silicon units except for the terminal groups which may comprise trialkyl or triphenyl silicon units as set forth in Patent 2,457,677, of a viscosity of less than 1000 centipoises. The unfired inorganic bodies may be dipped into the mixture, with sufficient water being present to hydrolyze the aminosilane and the treated bodies baked at 100° C. for one hour. Suitable dialkyl silicones are dimethyl silicones, diethyl silicones, butyl methyl silicone, decyl methyl silicones, and propyl ethyl silicones.

EXAMPLE IV

Unfired bodies composed of asbestos-lime-silica were immersed in a mixture composed of equal parts by weight of a dibutoxy diaminosilane and a dimethyl silicone fluid of a viscosity of about 200 centipoises, and 5% of water based on the weight of the total mixture. After being withdrawn from the mixture, the treated bodies were baked for 3 hours at 150° C. The water absorption of the bodies was reduced markedly by the treatment to less than 10% of the amount absorbed by the untreated bodies, and the electrical insulation properties were greatly improved.

Since certain changes in carrying out the above processes and certain modifications in the articles which embody the invention may be made without departing from its scope, it is intended that all matter contained in the above description or shown in the accompanying drawing shall be interpreted as illustrative and not in a limiting sense.

We claim as our invention:

1. In the process of impregnating an unfired, relatively porous, molded inorganic body with organosiloxanes to improve the electrical insulating properties thereof, the steps comprising applying to the exposed surfaces of the inorganic body a thin coating of an organosilane having attached to each silicon atom an average of from one to three hydrolyzable monovalent amino radicals, and the remaining substituents on silicon being selected from the group consisting of hydrocarbon and hydrocarbonoxy radicals, applying sufficient water to hydrolyze the aminosilane coating, heating the applied water and aminosilane coating to a temperature above 100° C. for at least one hour to hydrolyze, dehydrate and condense the applied aminosilane and water coating to an organosilane film adherent to and covering all the exposed surfaces of the inorganic body, thereafter impregnating the body in a heat-hardenable, partially condensed, hydrocarbon organosiloxane containing an average of from more than one to less than two hydrocarbon radicals per silicon atom, and heat hardening the applied hydrocarbon organosiloxane.

2. In the process of impregnating an unfired, relatively porous, molded inorganic body with organosiloxanes to improve the electrical insulating properties thereof, the steps comprising evaporating upon the exposed surfaces of the inorganic body a thin coating of an aminosilane having attached to each silicon atom an average of from one to three hydrolyzable amino-radicals, and the remaining substituents on silicon being selected from the group consisting of hydrocarbon and hydrocarbonoxy radicals, applying sufficient water to hydrolyze the aminosilane coating, heating the applied water and aminosilane coating to a temperature above 100° C. for at least one hour to hydrolyze, dehydrate and condense the applied aminosilane and water coating to an organosilane film adherent to and covering all the exposed surfaces of the inorganic body, thereafter impregnating the body in a heat-hardenable, partially condensed, hydrocarbon organosiloxane containing an average of from more than one to less than two hydrocarbon radicals per silicon atom, and heat hardening the applied hydrocarbon organosiloxane.

3. In the process of impregnating an unfired, relatively porous, molded inorganic body with organosiloxanes to improve the electrical insulating properties thereof, the steps comprising exposing the inorganic body to an atmosphere having a relative humidity of over 80% at a temperature of over 50° C. for a period of at least one hour to provide a film of water on all the exposed surfaces and porosities of the body, then applying to the exposed surfaces of inorganic body a thin coating of an aminosilane having attached to each silicon atom an average of from one to three hydrolyzable monovalent amino radicals, and the remaining substituents on silicon being selected from the group consisting of hydrocarbon and hydrocarbonoxy radicals, heating the applied water and aminosilane coating to a temperature above 100° C. for at least one hour to hydrolyze, dehydrate and condense the applied aminosilane and water coating to an organosilane film adherent to and covering all the exposed surfaces of the inorganic body, thereafter impregnating the body in a heat-hardenable, partially condensed, hydrocarbon organosiloxane containing an average of from more than one to less than two hydrocarbon radicals per silicon atom, and heat hardening the applied hydrocarbon organosiloxane.

4. In the process of impregnating an unfired, relatively porous, molded inorganic body with organosiloxanes to improve the electrical insulating properties thereof, the steps comprising exposing the inorganic body to an atmosphere having a relative humidity of over 80% at a temperature of over 50° C. for a period of at least one hour to provide a film of water on all the exposed surfaces and porosities of the body, then evaporating upon the humidified body a thin coating of an aminosilane having attached to each silicon atom an average of from one to three hydrolyzable monovalent amino radicals, and the remaining substituents on silicon being selected from the group consisting of hydrocarbon and hydrocarbonoxy radicals, heating the applied water and aminosilane coating to a temperature above 100° C. for at least one hour to hydrolyze, dehydrate and condense the applied organosilane and water coating to an organosilane film adherent to and covering all the exposed surfaces of the inorganic body, thereafter impregnating the body in a heat-hardenable, partially condensed, hydrocarbon organosiloxane containing an average of from more than one to less than two hydrocarbon radicals per silicon atom, and heat hardening the applied hydrocarbon organosiloxane.

5. A moisture resistant unfired inorganic body comprising the inorganic body and applied thereto an adherent organosilane film covering all the exposed surfaces thereof, the organosilane film comprising up to 200 parts by weight of a dialkyl silicone and 100 parts by weight of the hydrolysis and condensation product of an aminosilane having attached to each silicon atom an average of from one to three hydrolyzable monovalent amino radicals and the remaining substituents on silicon being selected from the group consisting of hydrocarbon and hydrocarbonoxy radicals, and a heavier coating of a heat hardened, hydrocarbon organosiloxane applied over the initial film, the hydrocarbon organosiloxane containing an average of from more than one to less than two hydrocarbon radicals per silicon atom.

6. An organosiloxane treated unfired, molded inorganic body comprising the inorganic body, an initial adherent film comprising the hydrolysis and condensation product of an organosilane having attached to each silicon atom an average of from one to three hydrolyzable monovalent amino radicals and the remaining substituents on silicon being selected from the group consisting of hydrocarbon and hydrocarbonoxy radicals, the initial film covering all the exposed surfaces of the inorganic body, and a heavier coating of a heat hardened, hydrocarbon organosiloxane applied over the initial film, the hydrocarbon organosiloxane containing an average of from more than one to less than two hydrocarbon radicals per silicon atom.

7. In the process of impregnating an unfired, relatively porous, molded inorganic body with organosiloxanes to improve the electrical insulating properties thereof, the steps comprising, applying to the exposed surfaces a coating of water and an organosilane having attached to each silicon atom an average of from one to three hydrolyzable monovalent amino radicals, and the remaining substituents on silicon being selected from the group consisting of hydrocarbon radicals, heating the coating to a temperature above 100° C. for at least one hour to hydrolyze, dehydrate and condense the applied aminosilane and water coating to an organosilane film adherent to and covering all the exposed surfaces of the inorganic body, thereafter impregnating the body in a heat-hardenable, partially condensed, hydrocarbon organosiloxane containing an average of from more than one to less than two hydrocarbon radicals per silicon atom, and heat hardening the applied hydrocarbon organosiloxane.

References Cited in the file of this patent

UNITED STATES PATENTS

| Number | Name | Date |
| --- | --- | --- |
| 2,306,222 | Patnode | Dec. 22, 1942 |
| 2,307,629 | MacIldowie | Jan. 5, 1943 |
| 2,360,367 | Ruber | Oct. 17, 1944 |
| 2,371,001 | Stone | Mar. 6, 1945 |
| 2,412,470 | Norton | Dec. 10, 1947 |
| 2,436,304 | Johannson | Feb. 17, 1948 |
| 2,439,689 | Hyde | Apr. 13, 1948 |
| 2,455,999 | Hyde | Dec. 14, 1948 |
| 2,462,635 | Haber | Feb. 22, 1949 |
| 2,477,779 | Zerner et al. | Aug. 2, 1949 |
| 2,494,920 | Warrick | Jan. 17, 1950 |
| 2,546,474 | Peyrot et al. | Mar. 27, 1951 |
| 2,557,786 | Johannson | June 19, 1951 |
| 2,564,674 | Cheronis | Aug. 21, 1951 |
| 2,567,804 | Davies | Sept. 11, 1951 |

OTHER REFERENCES

Sylon, Ind. and Eng. Chem., August 1946, page 17.

Bass, Silicones, Chemistry and Industry, April 5, 1947, pages 171–176.

Miner et al., Tertiary-Alkosy Aminosilanes, Div. of Ind. and Eng. Chem., Am. Chem. Soc., pages 71 and 81, April 14, 1947.